UNITED STATES PATENT OFFICE.

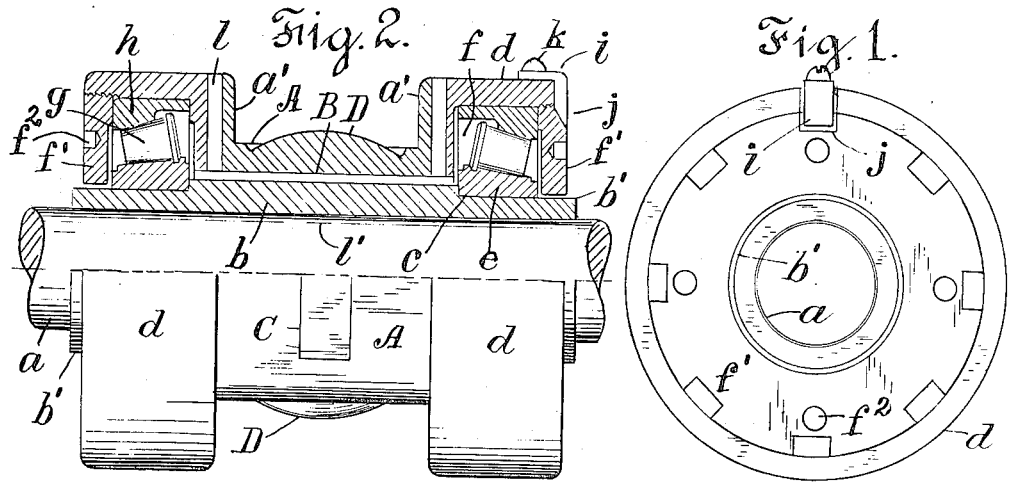
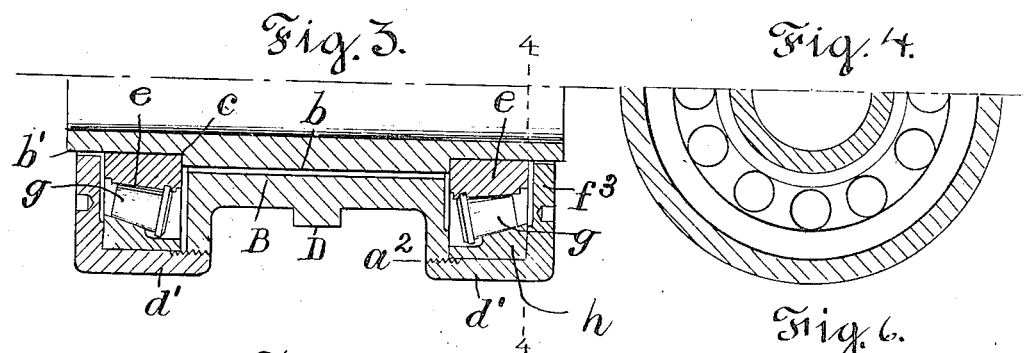
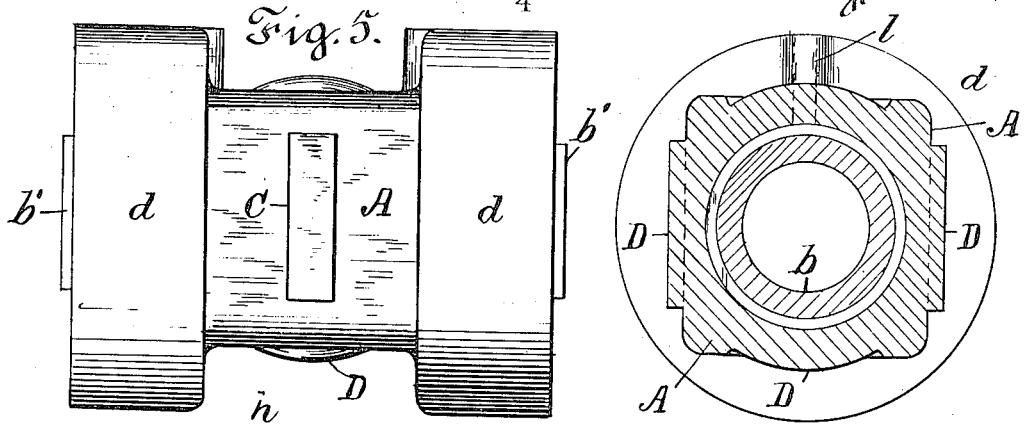
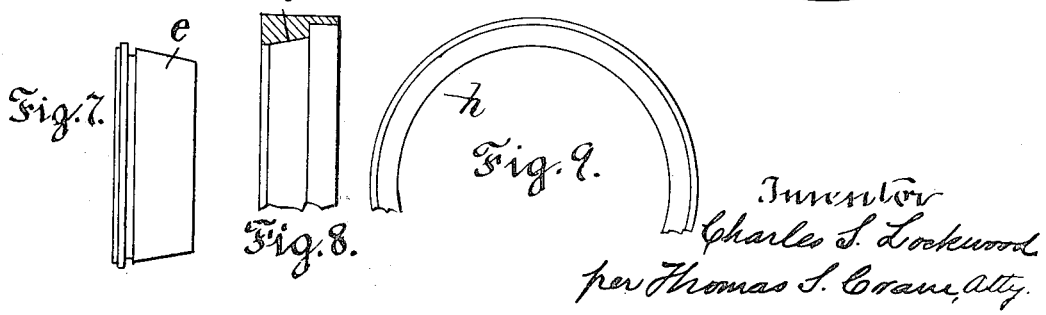

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING JOURNAL-BOX.

1,158,817.  Specification of Letters Patent.  Patented Nov. 2, 1915.

Application filed May 28, 1915. Serial No. 30,887.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearing Journal-Boxes, fully described and represented in the following specification and the accompanying drawings, forming a part of the same.

This invention relates to a shaft-bearing which may be used as a hanger-box for lines of shafting, or to support a shaft-journal upon the frame of some machine, as an electric motor. In such motors, a certain amount of end-play or reciprocation is allowed for the armature-spindle to adjust the armature to the field of the motor, but such reciprocation of the spindle would be injurious to the rolls and seats in a roller-bearing if the spindle rested directly upon the rolls. To permit such reciprocation and avoid its transmission to the rolls or roll-seats, I interpose a sleeve between the shaft-journal and the rolls, and construct the rolls to hold such sleeve from end-movement, the bore of the sleeve being fitted with sufficient freedom to the exterior of the journal to permit the reciprocation of the journal in the sleeve. The restraint of the sleeve from end-movement enables it to serve as an abutment for holding the shaft also from end-movement, if desired, by fixing a collar upon the shaft at the end of the sleeve.

The object of the invention is, therefore, to furnish a roller-bearing through which the journal of a shaft may have a longitudinal movement or reciprocation, and this object is attained, whatever use may be made of the bearing, by furnishing the casing of the box with a clearance-bore and extending a sleeve through such bore so that it may rotate without contact, and mounting the sleeve upon rolls supported in the casing, so that the shaft extended movably through the sleeve has all the advantages of a roller-bearing support while avoiding any contact with the rolls.

In the drawing, the invention is shown embodied in a shaft hanger-box with enlarged circular chambers in its opposite ends in which roll-seats and rolls may be mounted, the sleeve which extends through the box and the chambers being provided near its opposite ends with the hubs which are supported by the rolls.

The hanger-box can be constructed with cylindrical rolls revolving upon cylindrical seats, but tapering rolls and seats are shown in the drawing, because they are adapted to resist end-thrust, and thus prevent end-movement of the shaft when desired, by fastening a collar upon the shaft in contact with the end of the sleeve. Such use of a collar would be made upon a long line of shafting which can be held from any excessive end-play, by one collar at each end upon opposite sides of two hangers.

Where two sets of tapering rolls are used their tapers may be opposed to one another, and compensation for wear can be obtained by moving one of the outer roll-seats toward the other, when required.

These various features of the invention may be understood by reference to the annexed drawing, in which—

Figure 1 is an end view of the hanger-box; Fig. 2 is a side view of the box with longitudinal section of the same above the center line of the box; Fig. 3 is a similar section of one-half of a box showing an alternative construction; Fig. 4 is a cross section on line 4—4 in Fig. 3; Fig. 5 is a side view of the box; Fig. 6 is a transverse section of the box at the middle of Fig. 5; Fig. 7 is an elevation of one of the hubs for the rolls; Fig. 8 is a transverse section of one side of the annular roll-seat; and Fig. 9 is an end view of part of such a roll-seat.

$a$ designates the journal of the shaft to be supported; $b$ a sleeve fitted loosely to the same and shown with its ends $b'$ reduced in diameter to form shoulders $c$.

The body A of the casing is formed with heads $a'$ and with a bore B to clear the body of the sleeve $b$, and is provided with cup-shaped extensions or cylinders $d$ or $d'$ upon its ends to form circular chambers $f$ in which the rolls and roll-seats are fitted.

In Fig. 2, the body A is formed with heads $a'$ with which the cylinders $d$ are integral, and annular plates $f'$ are screwed into the ends of the cylinders to close the chambers and retain the roll-seats in their working relations. Hubs $e$ are fitted to the reduced portion of the sleeve $b$ against the shoulders c, the hubs being tapered outwardly forming seats to fit the rolls g, and held by the shoulders from end-movement when the tapering rolls crowd upon them.

Annular roll-seats h are fitted within the peripheries of the cylinders d and have a taper opposed to that of the hub so that the tapering rolls g are held more tightly upon the hub by adjusting one of the roll-seats h toward the other.

The roll-seat at the left-hand end of Fig. 2 is shown clamped against the head a' by the plate f'; but the roll-seat at the right-hand end is constructed to clear the head a', so that it may be adjusted by turning the plate f' which is provided with a locking-dog i fitted to notches j upon the outer side of the plate. The notches are sufficiently numerous to permit accurate adjustment of the plate, and the dog is secured in place, when adjusted, by a screw k.

The body A is made as small as the dimensions of the shaft-journal and sleeve b will permit, so as to permit the insertion of the hanger-box in a narrow hanger, and the body A is provided with guide-ribs C at the sides and with ball-faces D upon the top and bottom, to rest adjustably upon the supports in the hanger, as usual.

Oil-holes l are extended through the heads a' into the bore to supply the chambers f and the rolls with lubrication; and oil-holes may also be extended through the sleeve so that some of the oil may lubricate the bore of the sleeve and permit the journal of the shaft to turn freely therein if the bearing-rolls should be prevented by any accident from turning upon their seats.

By this construction, the shaft-journal is provided with independent means of supporting it rotatably, in one case revolving in the sleeve with appropriate lubrication, and in the other case carrying the sleeve with it and being rotatable upon the rolls and roll-seats.

In practice, the annular roll-seats h are fitted snugly within the periphery of the cylinders d so that they could not be readily removed when the end-plates f' are unscrewed; and the rolls could not, therefore, be removed from the bearing for examination or repairs.

Fig. 3 shows a modified construction in which the cylinders d' are formed integral with the plates which are marked $f^2$, the cylinders being connected with the heads a' by screw-threads $a^2$ which permit the cylinders and plates to be removed at any time from the hanger-box carrying with them the annular seats h and fully exposing the rolls to inspection and removal.

Rolls are shown between the roll-seat and the hub in Fig. 4, and in practice a cage is required to keep the rolls in their relation to one another, but the cage forms no part of the present invention, and is omitted from the drawing to avoid obscuring the essential parts of the construction.

From the above description it will be seen that the essential feature of the invention consists of the sleeve b fitted within the roll-bearing members and fitted loosely to the shaft-journal, so that the journal may slip or reciprocate endwise in the bearing.

The construction employed for the bearing members, that is, the rolls and their roll-seats, is not essential to the invention, as many forms of such roll-bearing members are adapted to support the sleeve within the casing of a journal-box. I have, however, made a special claim to the particular construction shown, as it affords certain advantages in the use of the bearing.

Having thus set forth the nature of the invention what is claimed herein is:

1. In a roller-bearing journal-box, the combination, with a casing having a chamber in each end with an annular roll-seat in its periphery, of a sleeve rotatable in the casing and a shaft fitted loosely to such sleeve, hubs secured upon the sleeve within the annular roll-seats, and rolls fitted to the hubs and seats, supporting the sleeve rotatably within the casing.

2. In a roller-bearing journal-box, the combination, with a casing having a chamber in each end with an annular roll-seat in its periphery, and a clearance-bore between the said chambers, of a sleeve passing loosely through the said bore and extended through the said chambers, hubs secured upon the sleeve within the annular roll-seats, and rolls fitted to the hubs and seats supporting the sleeve rotatable within the casing, the sleeve supporting the shaft loosely to permit end-movement of the shaft.

3. In a roller-bearing journal-box, the combination, with a casing having a chamber in each end with an annular roll-seat its periphery, of a sleeve rotatable in the casing and a shaft fitted loosely to such sleeve, hubs secured upon the sleeve within the annular roll-seats and having their taper opposed to the said seats, and means for adjusting the annular seats to and from one another to accurately fit the rolls upon the hubs.

4. In a roller-bearing hanger-box, the combination, with a casing having an enlarged circular chamber in each end and having a contracted body between the said chambers, of means upon such body for supporting and guiding the box in a hanger, a sleeve rotatable in the casing and projected through the said chambers, rolls within the said chambers, and seats for the same fitted to the chambers and the sleeve, substantially as herein set forth.

5. In a roller-bearing hanger-box, the combination, with a casing having an enlarged circular chamber in each end and having a contracted body between the said chambers, of annular tapering roll-seats fitted in the chambers, a sleeve fitted rotatably in the casing and projected through the said chambers and tapering hubs opposed to the taper of the roll-seats, tapering rolls fitted to the hubs and seats, and means for adjusting the annular seats to and from one another to accurately fit the rolls upon the hubs.

6. In a roller-bearing hanger-box, the combination, with a central body having a clearance-bore and provided with screw-threads upon its opposite ends, and flanged cylindrical caps screwed to such ends forming circular chambers in the ends of the casing, annular seats fitted within the periphery of such caps, a sleeve fitted rotatably in the bore of the casing and projected through the said caps and tapering hubs opposed to the taper of the roll-seats, and tapering rolls fitted to the hubs and seats.

In testimony whereof I have hereunto set my hand.

CHARLES S. LOCKWOOD.